United States Patent [19]

Baker

[11] Patent Number: 5,207,099
[45] Date of Patent: May 4, 1993

[54] LIQUID QUANTITY GAUGING

[75] Inventor: Peter D. Baker, Basingstoke, England

[73] Assignee: Smiths Industries Public Limited Company, London, England

[21] Appl. No.: 820,771

[22] Filed: Jan. 15, 1992

[30] Foreign Application Priority Data

Feb. 1, 1991 [GB] United Kingdom ............... 9102195

[51] Int. Cl.⁵ ............................................. G01F 23/14
[52] U.S. Cl. ................................. 73/292; 73/304 R; 364/509; 364/566
[58] Field of Search ............... 73/291, 293, 292, 304 R; 364/509, 567, 442; 250/277, 906

[56] References Cited

U.S. PATENT DOCUMENTS

| | | | |
|---|---|---|---|
| 3,120,124 | 2/1964 | Seliger et al. | 73/291 |
| 3,818,760 | 6/1974 | Howard | 364/509 X |
| 3,995,169 | 11/1976 | Oddon | 250/906 X |
| 4,258,422 | 3/1981 | Dougherty et al. | 364/509 X |
| 4,470,296 | 9/1984 | Kobayashi et al. | 73/291 X |
| 4,471,656 | 9/1984 | Sanders et al. | 73/438 |
| 4,494,210 | 1/1985 | Miller | 364/567 |
| 4,598,742 | 7/1986 | Taylor | 364/509 X |
| 4,630,475 | 12/1986 | Mizoguchi | 73/293 |
| 4,669,309 | 6/1987 | Cornelius | 73/299 |
| 4,739,494 | 4/1988 | Torii | 364/567 |
| 5,088,324 | 2/1992 | Nemeth | 73/291 |

Primary Examiner—Daniel M. Yasich
Attorney, Agent, or Firm—Pollock, VandeSande and Priddy

[57] ABSTRACT

An aircraft fuel gauging system has three or more optical pressure sensors 1 and 3 mounted in a tank 10. One sensor 1 is mounted on the floor 14 of the tank, the other sensors 2 and 3 being displaced from the first sensors and from each other in the x, y and z directions. The output of each sensor 1 to 3 is representative of the mass of fuel above the sensor and is supplied to a processor 20. The processor 20 is also connected to an three-axis accelerometer system 21, a pressure sensor 24 above the liquid and a density sensor 25. Utilizing these inputs the processor 20 computes the location of the fuel surface and, from information in the store 22 of tank shape, calculates the mass of fuel.

7 Claims, 1 Drawing Sheet

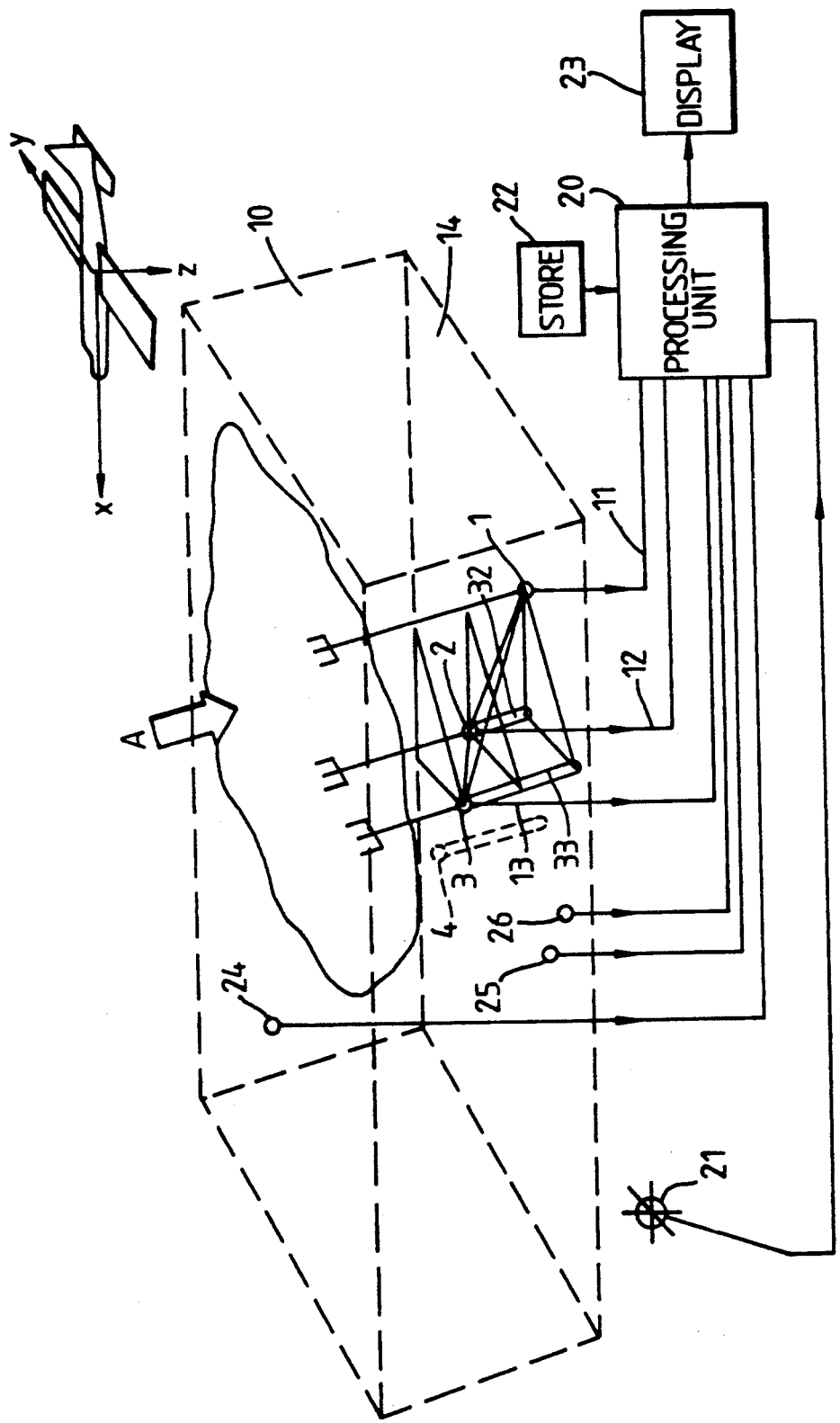

LIQUID QUANTITY GAUGING

BACKGROUND OF THE INVENTION

This invention relates to systems for measuring the quantity of liquid in a tank.

The invention is more particularly, but not exclusively, concerned with apparatus for determining the mass of fuel in aircraft fuel tanks.

Various methods exist for measuring fuel mass in aircraft fuel tanks. The methods can involve the use of floats, capacitor probes or ultrasonics to measure the height of fuel. Mass is then computed from knowledge of bulk fuel density, tank geometry and aircraft attitude etc.

The problem with these techniques is that they all involve the use of electrical sensor transducers to convey information to a processor and display. The use of electrical transducers and their associated cables brings with it problems of electromagnetic compatibility and interference, and high weight especially where screened cables are used with capacitive probes.

BRIEF SUMMARY OF THE INVENTION

It is an object of the present invention to provide a liquid quantity gauging system that avoids the need for electrical transducers.

According to one aspect of the present invention there is provided a system for determining the quantity of liquid in a tank including at least three optical pressure sensors located in the tank for immersion in the liquid, the sensors being located on skew lines so that the sensors are normally not in the same horizontal plane with respect to the liquid surface, each sensor providing an optical output representative of the mass of fluid above the sensor, the system including a store for information representative of the shape of the tank, and the system including processor means arranged to determine the quantity of liquid in the tank from the output of the sensors and from the information of the shape of the tank.

One of the sensors may be located on the floor of the tank, a second of the sensors being displaced from the one sensor in each of the x, y and z directions, and a third of the sensors being displaced from the one and second sensors in each of the x, y and z directions. The system may include a fourth sensor, the fourth sensor being displaced from each of the other sensors in each of the x, y and z directions. The system may include an accelerometer arranged to measure acceleration in three axes in the region of the tank, the output of the accelerometer being provided to the processor. The system may include a pressure sensor mounted in the region of the tank outside the liquid, the output of the pressure sensor being provided to the processor. The system may include a density sensor mounted for immersion in the liquid and the output of the density sensor being provided to the processor. The system may include a temperature sensor mounted for immersion in the liquid, the output of the temperature sensor being provided to the processor.

An aircraft fuel-gauging system in accordance with the present invention, will now be described, by way of example, with reference to the accompanying drawing.

BRIEF DESCRIPTION OF THE DRAWING

The drawing is a schematic perspective view of the system.

DETAILED DESCRIPTION OF THE PREFERRED EMBODIMENT

The system comprises three optical pressure sensors 1 to 3 mounted at different locations within an aircraft fuel tank 10. The outputs of the sensors 1 to 3 are supplied via optical fibre cables 11 to 13 respectively to a processing unit 20 which also receives the output from a three-axis accelerometer system 21 which provides an output representative of the local acceleration vector in the region of the tank 10. A pressure sensor 24 mounted in the tank 10 above the level of fuel provides an output to the processing unit 20 indicative of atmospheric pressure. The pressure sensor 24 could be mounted anywhere in the region of the tank outside the fuel. The processing unit 20 also receives an output from a memory or store 22 which contains information about the internal shape of the tank 10 with respect to the sensor locations. The information in the store 22 may be in the form of a look-up table which tabulates fuel quantity against the sensor outputs so that the processing unit 20 can provide an output in accordance with fuel mass to a display 23. Alternatively, the processing unit could perform an algorithm to determine fuel mass. Similar forms of processing unit 20 and store 22 have been used previously to determine fuel quantity from the outputs of different sensors, such as, for example, a capacitive fuel height probe.

The optical pressure sensors 1 to 3 may be of any conventional kind, for example: indirect sensors, such as having a diaphragm deflected by pressure which interacts with an optical beam; direct sensors in which force applied to an optical element directly alters its transmission, polarization or other measureable characteristic; displacement induced micro-bending sensors, in which microbending along the axis of an optical fibre introduces extra losses caused by mode coupling from the core to the cladding; or displacement induced birefringence sensors, in which external force causes stress in a fibre and birefringence, thereby altering the refractive index between the two modes.

The sensors 1 to 3 are preferably each of the same kind so that they all behave in the same way on change in pressure or other environmental factors.

The first sensor 1 is mounted on the floor 14 of the tank 10 and provides a datum. The second sensor 2 is mounted at a distance away from the first sensor 1 in each of the x, y and z directions where z is a perpendicular and x and y are mutually orthogonal axes. Similarly, the third sensor 3 is displaced from the first and second sensors 1 and 2 in the x, y and z directions. The three sensors 1, 2 and 3 lie on skew lines, in a plane inclined to the base of the tank 10, with each sensor within the fuel at a different depth below the fuel surface, when the fuel surface is parallel to the tank floor 14. The mounting of the sensors 2 and 3 may be by means of vertical struts 32 and 33 extending from the tank floor 14. The lowest triangle T1 in the drawing has one apex formed by the sensor 1 on the tank floor 14 and its other apexes formed where vertical lines from the sensors 2 and 3 meet the tank floor. The other two triangles T2 and T3 are parallel to the lowest triangle T1 and contain the sensors 2 and 3, respectively.

In general, the surface of the fuel will not be parallel to the base floor 14 but will be perpendicular to the local acceleration vector A acting on the fuel. The earth's acceleration vector A will depend on the magnitude of gravity and its orientation, and on the movement of the aircraft. The output of the accelerometer system 21 is therefore representative of the orientation of the liquid surface and is representative of the magnitude of the acceleration.

It will be appreciated that the pressure at each sensor 1 to 3 is dependent on the mass of fuel above the sensor and the acceleration. The mass of fuel is dependent on the height of fuel and its density. The processor 20 receives the outputs of the three sensors 1 to 3 and that of accelerometer system 21 and computes the location of the fuel surface. The store 22 contains information about the internal shape of the tank 10 and, in particular, about the tank section in each of the three planes perpendicular to surface containing any two of the three sensors.

The fuel tank may include a density sensor 25 that provides an output to the processor 20 representative of the density of fuel so that compensation for this can be made. Alternatively, the processor 20 may be programmed with an indication of fuel density on refueling. Preferably, in this case, a temperature sensor 26 immersed in fuel in the fuel tank 10 would provide a temperature output to enable compensation as temperature changes.

With this information, the processor 20 is able to provide an indication of the mass or volume of fuel present in the tank.

In most aircraft there are several fuel tanks which will each require its own set of sensors. The processor can either provide separate indications of mass in each tank or provide a total value.

Although the apparatus described above has three sensors in a tank, it would be advantageous to have a greater number of sensors, such as a fourth sensor 4. Using four enables four data sets to be processed from the four different combinations of any three of the sensors, in contrast with the single datum set which three sensors provides. By using four sensors in wing tanks it is possible to measure and compensate for curvature of the tank caused by flexing of the wing during flight. This can be used to improve accuracy.

It will be appreciated that the invention is neither confined to use in determining fuel level nor confined to use in aircraft. The absence of any electrical power at the sensors does, however, have particular advantages in flammable liquid applications. The robustness, lightweight and lack of electromagnetic inference problems gives the optical sensor particular advantages in aircraft applications.

What I claim is:

1. A liquid-gauging system for determining the quantity of liquid in a tank having a floor, comprising: at least three optical pressure sensors, each sensor being adapted to provide an optical output that varies in response to change of the mass of liquid in the tank above the sensor; means mounting the sensors in the tank for immersion in the liquid and for location on skew lines so that the sensors are normally not in the same horizontal plane with respect to the liquid surface, the sensors being displaced from one another in each of the x, y and z directions and at least two of the sensors being mounted above the floor of the tank; a store containing information representative of the shape of the tank; a processor; and means connecting the processor with the store and the sensors such that the processor determines the quantity of liquid in the tank from the outputs of the sensors and the stored information representing the shape of the tank.

2. A system according to claim 1, including a temperature sensor mounted for immersion in the liquid, and means supplying an output of the temperature sensor to the processor.

3. A liquid-gauging system according to claim 1, wherein the system includes a fourth sensor, means mounting the fourth sensor and in the tank for immersion in the liquid, the fourth sensor being displaced from each of the other sensors in each of the x, y and z directions.

4. A system according to claim 1, including an accelerometer system arranged to measure acceleration in three axes in the region of the tank, and wherein the liquid-gauging system includes means for supplying the output of the accelerometer system to the processor.

5. A system according to claim 1, including a pressure sensor, means mounting the pressure sensor in the region of the tank outside the liquid, and means supplying an output of the pressure sensor to the processor.

6. A system according to claim 1, including a density sensor, means mounting the density sensor for immersion in the liquid, and means supplying an output of the density sensor to the processor.

7. A liquid-gauging system for determining the quantity of liquid in a tank comprising: a first optical pressure sensor arranged to provide an optical output that varies in response to change of the mass of liquid above said first sensor; means mounting the first sensor on a floor of the tank; a second optical pressure sensor arranged to provide an optical output representative of the mass of liquid above said second sensor; means mounting the second sensor in the tank at a location displaced from the first sensor in each of the x, y, and z directions; a third optical pressure sensor arranged to provide an optical output representative of the mass of liquid above said third sensor; means mounting the third sensor at a location displaced from both the first and second sensors in each of the x, y and z directions; an accelerometer system providing an output representative of acceleration in the vicinity of the tank; a processor; means supplying the outputs of the three sensors and the output of the accelerometer system to the processor for use by the processor to compute the location of the surface of the liquid; a store containing information representative of the shape of the tank; and means connecting the processor with the store such that the processor can determine the quantity of the liquid in the tank from the location of the surface of the liquid and said information of the shape of the tank.

* * * * *